(12) United States Patent
Olczak et al.

(10) Patent No.: US 6,275,256 B1
(45) Date of Patent: Aug. 14, 2001

(54) DIGITAL CAMERA ILLUMINATOR FOR THE IMAGING OF SPECULAR OBJECTS

(75) Inventors: Eugene G. Olczak, Rochester; Thomas Szumla, Lockport; Joseph L. Baker, Victor, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 08/984,275

(22) Filed: Dec. 3, 1997

(51) Int. Cl.[7] ............................. H04N 7/18; H04N 5/222; G01J 1/00
(52) U.S. Cl. ......................... 348/131; 348/132; 348/371; 348/370; 250/495.1
(58) Field of Search ...................... 348/370, 371, 348/131, 132; 235/462.41, 462.42

(56) References Cited

U.S. PATENT DOCUMENTS 4,866,285   9/1989  Simms .
5,443,597 * 8/1995  Kitchloo et al. ........................ 8/444
5,461,417 * 10/1995 White et al. .......................... 348/131
5,701,015 * 12/1997 Lungershausen et al. ........ 250/495.1

* cited by examiner

Primary Examiner—Wendy R. Garber
Assistant Examiner—Rashawn N. Tillery
(74) Attorney, Agent, or Firm—Thomas H. Close

(57) ABSTRACT

An illuminator for a digital camera includes a body of transparent material defining a cone shaped cavity with an opening at the apex of the cone for a taking lens of the camera and an opening at the base of the cone for locating an object to be photographed with the digital camera. A plurality of light emitting diodes (LEDs) are uniformly distributed throughout the body of transparent material with respect to the surface of the cone. A power supply applies power to the LEDs so that their brightness' are equal.

8 Claims, 3 Drawing Sheets

DIGITAL CAMERA ILLUMINATOR FOR THE IMAGING OF SPECULAR OBJECTS

CROSS REFERENCE TO RELATED APPLICATIONS

Reference is made to U.S. Ser. No. 08/699,315, filed Aug. 19, 1996, and allowed May 13, 1997, entitled "Infrared Illumination System for Digital Camera", by Arnold Lungershausen et al.

This invention was made with Government support under contract number S6W9606406 for the Department of Justice. The Government has certain rights in this invention.

FIELD OF THE INVENTION

The invention relates generally to the field of digital photography, and in particular to infrared illumination systems for digital infrared cameras used for example in surveillance, machine vision, and microscopy to image objects having spectrally reflecting surfaces.

BACKGROUND OF THE INVENTION

It is known to employ digital cameras to capture infrared information from a scene having specular surfaces, for example a part on an assembly line, or a specimen in a microscope. It is also known to use a source of artificial infrared illumination to aid in the capture of such images. A problem occurs in such image capture situations because the specular reflections of the source of infrared illumination wash out the detail in the image in the neighborhood of the specular reflection. Furthermore, in applications such as surveillance, it would be preferable if the source of such illumination remained unnoticed by the subject. Conventional flash systems capable of producing substantial infrared light also produce appreciable quantities of visible light. If the visible light from such a flash is filtered to produce an infrared flash, the resulting flash apparatus is inefficient, since a considerable portion of the energy produced by the flash is wasted. In applications such as machine vision and microscopy, it is desirable that the source of illumination be highly uniform and extended in space (non point source) to minimize the intensity of specular reflections. However, in applications where the object needs to be close to the lens, there is scant room for an extended light source. Therefore, it is also desirable for the light source to be compact, a requirement that is in apparent conflict with the need for the light source to be extended.

U.S. Pat. No. 4,866,285, issued Sep. 12, 1989, to Simms discloses a light source for an infrared film camera having one or more infrared diode light sources. It has been found that due to the point source nature of the infrared diodes, the illumination from such a light source is non-uniform at the subject and the point source nature of the diodes causes intense specular reflections from an object having specularly reflecting surfaces. There is therefore a need for an improved, energy efficient, uniform source of infrared illumination for infrared electronic photography.

SUMMARY OF THE INVENTION

The present invention is directed to overcoming one or more of the problems set forth above. Briefly summarized, according to one aspect of the present invention, an illuminator for a digital camera includes a body of transparent material defining a cavity with an opening for locating a taking lens of the camera and an opening for locating an object to be photographed with the digital camera. A plurality of light emitting diodes (LEDs) are uniformly distributed throughout the body of transparent material with respect to the surface of the cone. A power supply applies power to the LEDs so that their brightnesses are equal. In a preferred embodiment of the invention, the body of material is infrared transmissive, the LEDs are infrared emitting diodes, the cavity is a cone shaped cavity, and the surface finish of the cavity is a flat finish.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of providing a uniform, energy efficient illumination of the photographic subject resulting in few noticeable specular reflections.

DETAILED DESCRIPTION OF THE INVENTION

Figure 1:
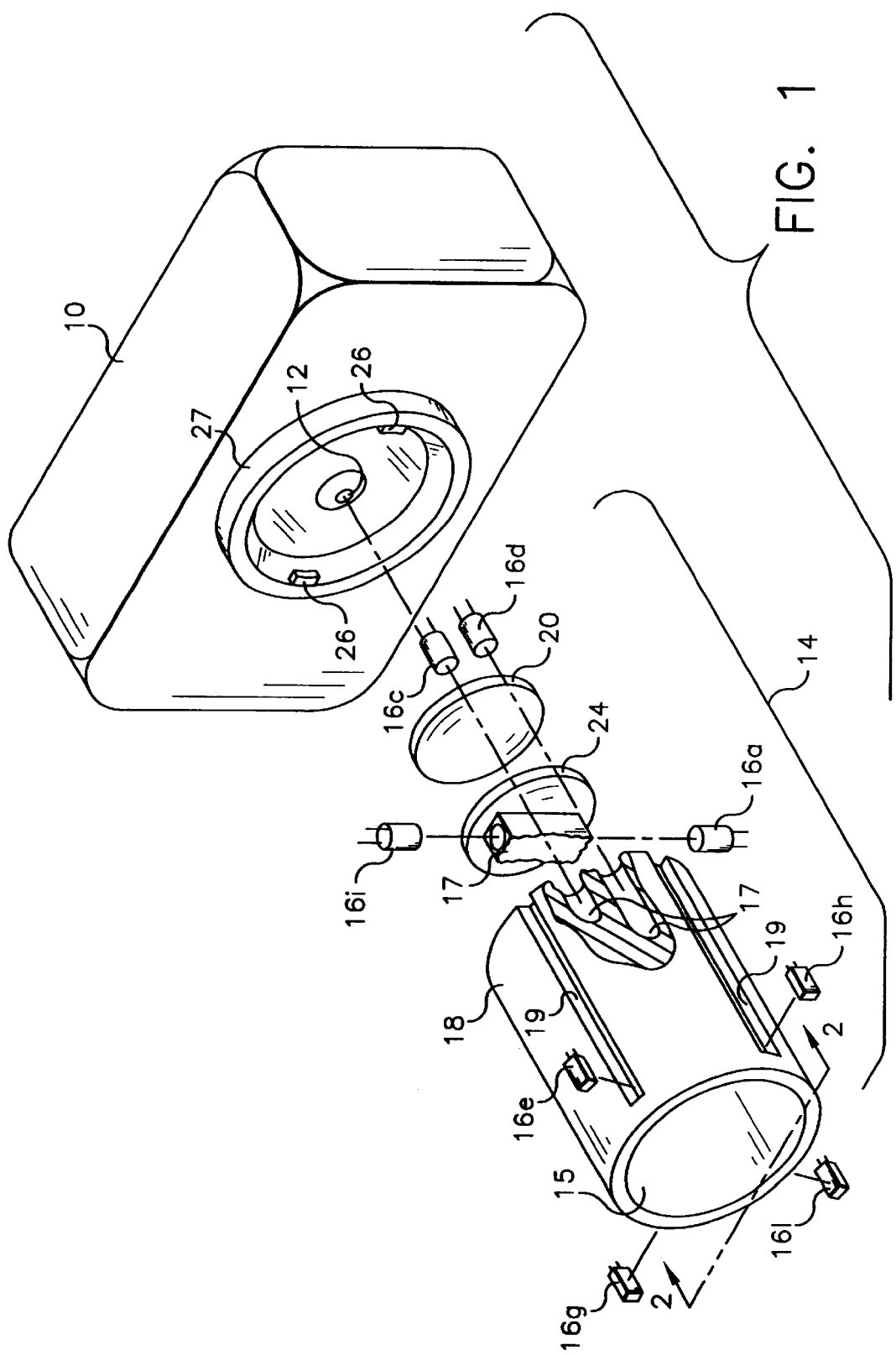
FIG. 1 is a exploded perspective view, partially broken away, of an infrared illumination system according to the present invention.
Figure 2:
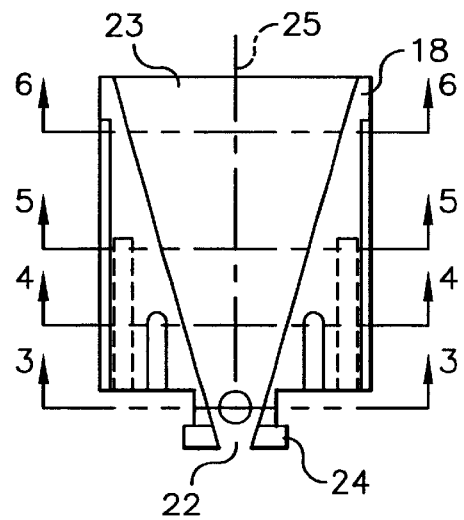
FIG. 2 is a cross sectional view of the infrared illumination system taken along lines 2—2 in FIG. 1.

Referring to FIG. 1, a digital infrared camera 10 of the type known in the prior art, such as custom miniaturized Infrared Cameras sold by the Eastman Kodak Company, Rochester, N.Y., has a taking lens 12. An infrared illumination system 14 according to the present invention surrounds the taking lens 12 and includes a plurality of infrared light emitting diodes (IR-LEDs) $16_{a-l}$, such as the TSUS 4400 infrared light emitting diodes from the Telefunken Semiconductor Corp., Germany. As shown in FIG. 1, the IR-LEDs 16 are packaged in a light diffusing body 18 of infrared transmissive plastic that defines a cone shaped cavity 15 with an opening 22 (see FIG. 2) at the apex of the cone for the taking lens 12 of the camera 10 and an opening 23 at the base of the cone for locating an object to be photographed with the digital camera 10. Alternatively, the cavity can define a shape that substantially deviates from a cone, such as a parabolic surface of revolution. The IR-LEDs 16 are arranged symmetrically around taking lens 12 with respect to the surface of the cone shaped cavity 15. The body 18 is provided with holes 17 and slots 19 for receiving the diodes 16. A sapphire glass window 20, located between the camera lens 12 and the opening 22 at the apex of the cone shaped cavity provides a protective cover for the taking lens 12. The sapphire glass window 20 is attached, for example by cyanoacrylate super glue, to a mounting pad 24 formed on the back of the body 18.

The light diffusing body 18 is made from polycarbonate plastic impregnated with Filtron™ absorptive dye manufactured by the Gentex Corp., Carbondale, Pa. The plastic material with the dye is absorptive to visible light, but highly transmissive to infrared. It was found that the light source performed best when the inside surface of the cone shaped cavity had a flat finish. The flat finish on the inside surface was provided by milling the cone shaped cavity on a lath.

Figure 3:
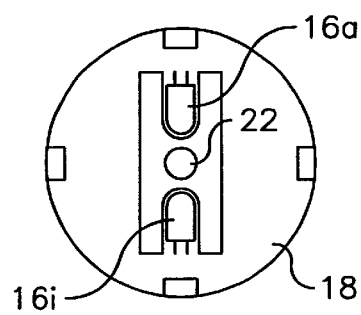
FIG. 3 is a cross sectional view of the infrared illumination system taken along lines 3—3 in FIG. 2.
Figure 4:
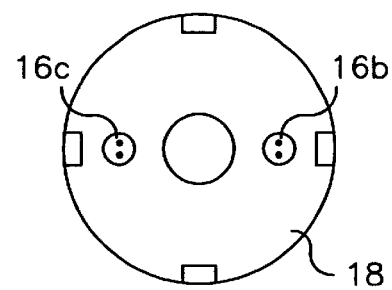
FIG. 4 is a cross sectional view of the infrared illumination system taken along lines 4—4 in FIG. 2.
Figure 5:
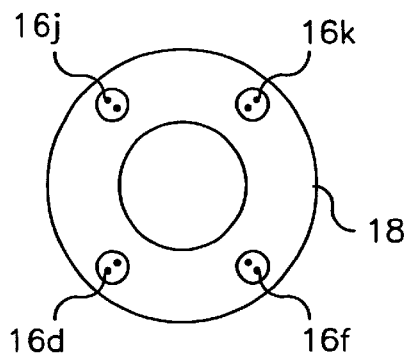
FIG. 5 is a cross sectional view of the infrared illumination system taken along lines 5—5 in FIG. 2.
Figure 6:
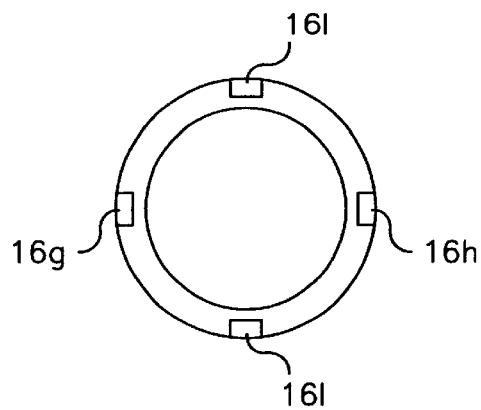
FIG. 6 is a cross sectional view of the infrared illumination system taken along lines 6—6 in FIG. 2.

Referring to FIGS. 2–6, the locations and orientations of the IR-LEDs $16_{a-l}$ within the light diffusing body 18 will be described. As shown in FIGS. 3 and 6, IR-LEDs $16_{a,i,e,g,l\ and\ h}$ are located in holes that are bored in the diffusing body at an angle perpendicular to the axis 25 of the cone shaped cavity. As shown in FIGS. 4 and 5, the IR-LEDs $16_{b,c,d,f,j,\ and\ k}$, are located in holes 17 that are bored parallel to the axis of the cone shaped cavity. The IR-LEDs are secured in their respective holes 17 with cyanoacrylate super glue. IR-LEDs $16_{e,g,h\ and\ l}$ are installed in slots 19. The slots 19 extend to the end of the body 18 to accommodate the wires for their respective IR-LEDs. The plastic containers of IR-LEDs $16_{e,g,h\ and\ l}$ were trimmed to reduce their thickness so that they would fit in the slots 19 without protruding into the cavity, or beyond the surface of the body 18. To prevent visible light from entering the diffusing body 18, the outside surface of the body was painted with flat black paint.

The infrared illumination system 14 is secured to the front of camera 10 by a mounting ring 27 on the front of the camera that receives the mounting pad 24 and secures the illumination system 14 to the front of the camera with detents 26.

Figure 7:
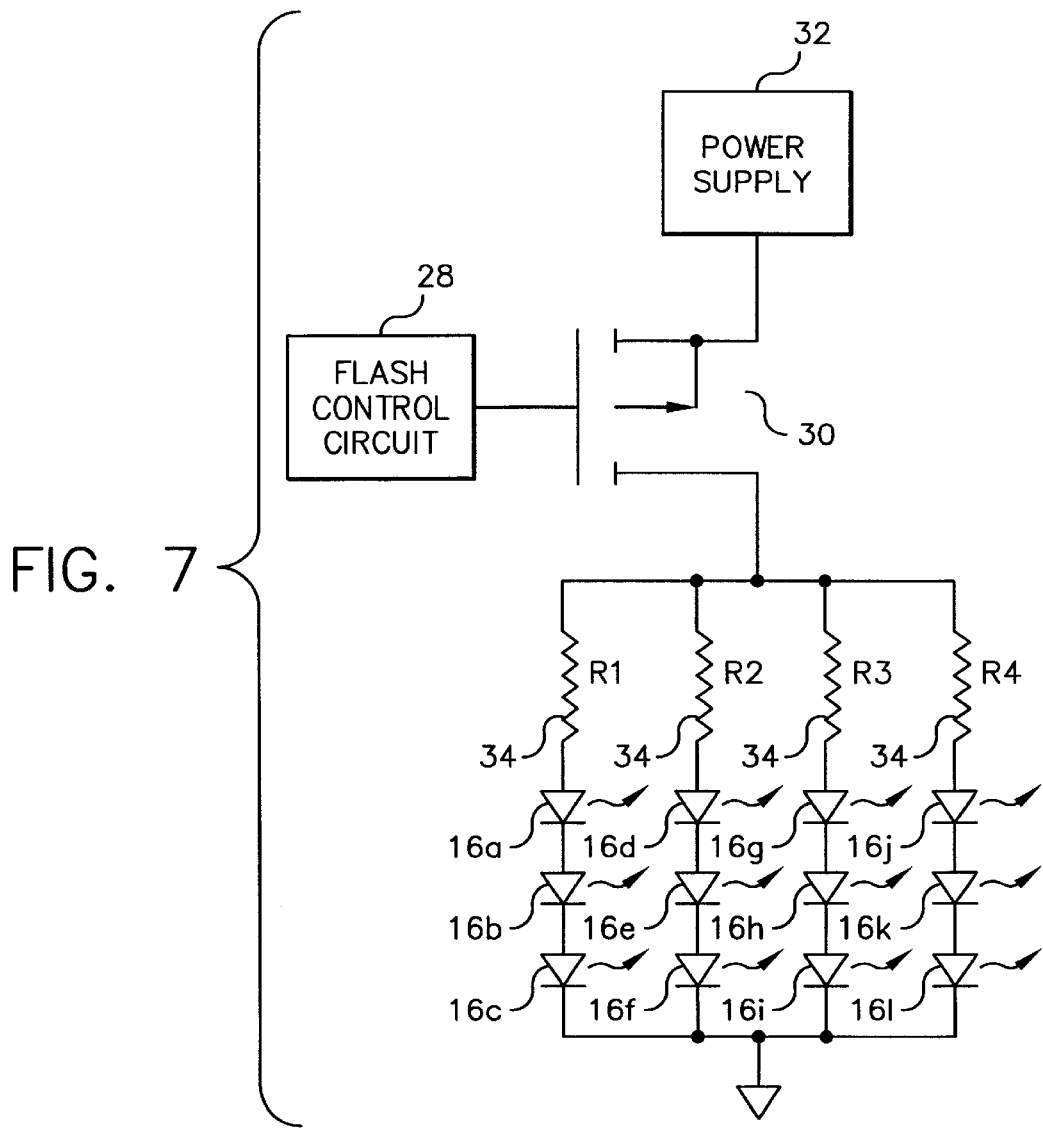
FIG. 7 is a schematic diagram of a control circuit for the illumination system of the present invention.

Referring to FIG. 7, a flash control electrical circuit 28 located in the camera 10 applies a control pulse of variable width, depending on the amount of illumination desired, to enable a P channel MOSFET 30 to apply power from a flash power supply 32 simultaneously to all of the IR-LEDs $16_{a-l}$ when the camera 10 is actuated. The IR-LEDs are wired in four parallel legs, each leg containing three diodes in series with a current limiting resistor 34. The values of the respective resistors 34 are chosen to adjust LED brightness to a desired uniform level. The IR-LEDs are wired in the diffusing body 18 such that each layer of LEDs (as shown in FIGS. 2–6) contains IR-LEDs from more than one leg of the electrical circuit, where wiring ability permits. This technique of distributing the LEDs further enhances the ability of the diffusing cone to provide a homogeneous source of illumination.

The extended source according to the present invention will appear to the object as a nearly a uniform source of illumination extending from horizon to horizon. There is only one flaw in the uniformity, and that will be at the opening at the apex of the cavity near the lens of the camera. This flaw is minimized by making the opening as small as possible, and can be further minimized by placing a partially reflective surface over the opening. For example, the sapphire window 20 may be provided with a partially reflective coating for this purpose.

The invention has been described with reference to a preferred embodiment. However, it will be appreciated that variations and modifications can be effected by a person of ordinary skill in the art without departing from the scope of the invention. For example although 12 IR-LEDs are shown in the preferred embodiment, more or fewer LEDs can be used in the present invention. Also, although the light source is shown as an infrared light source, a visible light source can also be constructed according to the present invention by using a body of material transparent to visible radiation and visible light emitting LEDs.

What is claimed is:

1. An illuminator for a digital camera, comprising:

a) a body of transparent material defining a cavity with an opening for a taking lens of the camera and an opening for locating an object to be photographed with the digital camera;

b) a plurality of light emitting diodes (LEDs) uniformly distributed in a plurality of layers throughout the body of transparent material with respect to the surface of the cavity; and c) a power supply for applying power to the LEDs so that their brightnesses are equal, by arranging the LEDs in a plurality of legs wherein the LEDs in each leg are in series connection, and wherein each layer contains diodes from more than one leg.

2. The illuminator claimed in claim 1, wherein the cavity is a cone shaped cavity, the opening for the taking lens of the camera is located at the apex of the cone shaped cavity and the opening for the object is located at the base of the cavity.

3. The illuminator claimed in claim 2 for an infrared sensitive digital camera, wherein the body of transparent material is transparent to infrared light, the LEDs are infrared emitting diodes, and the surface finish of the cone shaped cavity is a flat finish.

4. The illuminator claimed in claim 3, further comprising an infrared transmissive window over the window at the apex of the cone.

5. The illuminator claimed in claim 4, wherein the infrared transmissive window is partially IR-reflecting.

6. The illuminator claimed in claim 3, wherein the body of infrared transparent material is polycarbonate impregnated with IR transmissive dye.

7. The illuminator claimed in claim 3, further comprising a coating of black paint on the outside of the body of the transparent material.

8. The illuminator claimed in claim 3, having 12 infrared emitting LEDs arranged in four levels around the cone shaped cavity.

* * * * *